US008671059B2

(12) United States Patent  
Weller

(10) Patent No.: US 8,671,059 B2  
(45) Date of Patent: Mar. 11, 2014

(54) REMOTE FEATURE DELIVERY FOR OUTPUT DEVICES

(75) Inventor: Scott Wayne Weller, Penfield, NY (US)

(73) Assignee: Google Inc., Mountain View, CA (US)

( * ) Notice: Subject to any disclaimer, the term of this patent is extended or adjusted under 35 U.S.C. 154(b) by 701 days.

(21) Appl. No.: 11/674,865

(22) Filed: Feb. 14, 2007

(65) Prior Publication Data

US 2007/0136137 A1     Jun. 14, 2007

Related U.S. Application Data

(62) Division of application No. 10/165,702, filed on Jun. 7, 2002, which is a division of application No. 09/309,078, filed on May 10, 1999, now Pat. No. 6,424,950.

(51) Int. Cl.  
*G06Q 99/00*     (2006.01)

(52) U.S. Cl.  
USPC .......................................................... 705/51

(58) Field of Classification Search  
USPC .................................................... 705/26, 51  
See application file for complete search history.

(56) References Cited

U.S. PATENT DOCUMENTS

| | | |
|---|---|---|
| 5,036,518 A | 7/1991 | Tseung |
| 5,264,164 A | 11/1993 | Pickett et al. |
| 5,287,537 A | 2/1994 | Newmark et al. |
| 5,509,070 A | 4/1996 | Schull |
| 5,710,886 A | 1/1998 | Christensen et al. |
| 5,754,748 A | 5/1998 | Rivers et al. |
| 5,855,007 A | 12/1998 | Jovicic et al. |
| 5,892,900 A | 4/1999 | Grinter et al. |
| 5,930,553 A * | 7/1999 | Hirst et al. .......................... 399/8 |
| 5,935,243 A | 8/1999 | Hasebe et al. |
| 6,058,381 A * | 5/2000 | Nelson ............................. 705/40 |
| 6,061,660 A * | 5/2000 | Eggleston et al. ........... 705/14.12 |
| 6,067,622 A | 5/2000 | Moore |
| 6,073,124 A | 6/2000 | Krishnan et al. |
| 6,074,434 A | 6/2000 | Cole |
| 6,154,731 A | 11/2000 | Monks et al. |
| 6,189,146 B1 * | 2/2001 | Misra et al. ..................... 717/177 |
| 6,195,432 B1 * | 2/2001 | Takahashi et al. ............. 380/277 |
| 6,223,291 B1 * | 4/2001 | Puhl et al. ........................ 726/28 |

(Continued)

FOREIGN PATENT DOCUMENTS

| EP | 128555 A2 * | 12/1984 | ............... H04N 7/16 |
|---|---|---|---|
| WO | WO 97/50063 | 12/1997 | |

OTHER PUBLICATIONS

Gryphon, Robert, "Evolution of the Fax", InfoWorld, v. 17, n. 14, p. 62-76; Apr. 3, 1995.

(Continued)

*Primary Examiner* — James D Nigh  
(74) *Attorney, Agent, or Firm* — Lerner, David, Littenberg, Krumholz & Mentlik, LLP

(57) ABSTRACT

A programmable feature is remotely delivered to an output device, such as a printer. The delivery of the feature is initiated by the customer tendering payment for the feature. The customer is provided with a coupon and the coupon is subsequently redeemed. The customer receives a feature key in response to redeeming the coupon. The feature key is used to install the feature on the output device of the customer. The feature key may be a print job that contains encrypted text. Security measures may be provided to ensure that the coupon and feature key are valid.

10 Claims, 7 Drawing Sheets

(56) References Cited

U.S. PATENT DOCUMENTS

| | | | |
|---|---|---|---|
| 6,264,561 B1 * | 7/2001 | Saffari et al. | 463/42 |
| 6,347,398 B1 | 2/2002 | Parthasarathy et al. | |
| 6,356,353 B1 | 3/2002 | Fujimori et al. | |
| 6,424,950 B1 | 7/2002 | Weller | |
| 6,519,700 B1 | 2/2003 | Ram et al. | |
| 6,671,060 B1 | 12/2003 | Fresk et al. | |
| 6,704,872 B1 * | 3/2004 | Okada | 713/194 |
| 6,825,941 B1 | 11/2004 | Nguyen et al. | |
| 6,925,444 B1 * | 8/2005 | McCollom et al. | 705/14.51 |

OTHER PUBLICATIONS

HP Color LaserJet and LaserJet Series Printers—History of Printer Command Language (PCL)—bp104568—HP Business Support Center, 6 pages, http://h20000.www2.hp.com/bizsupport/TechSupport/Doc...ang=en&cc=us&objectID=bpl04568&jumpid=reg_R1002_USEN (1 of 6)Apr. 4, 2009 5:17:22 PM.

Bpl13208, Printer Job Language Technical Reference Manual, HP, 342 pages, 2003 Hewlett Packard Company.

Bpl13207, hpPCL/PJL reference printer job language technical reference addendum, HP, 176 pages, 2003 Hewlett Packard Company.

Microsoft® Computer Dictionary, Fifth Edition •by: Microsoft Corporation Publisher: Microsoft Press Pub. Date: May 1, 2002 • Print ISBN-10: 0-7356-1495-4 •Print ISBN-13: 978-0-7356-1495-6 • Pages in Print Edition: 656.

Machine Translation of Japanese Publication No. 09-007020, entitled "Method/System/Terminal for Charged Offer of Software", publication date Jan. 10, 1997, applicant Dainippon Printing Co. Ltd.

* cited by examiner

REMOTE FEATURE DELIVERY FOR OUTPUT DEVICES

CROSS REFERENCE TO RELATED PATENTS AND APPLICATIONS

This is a divisional of application of U.S. Ser. No. 10/165,702, filed Jun. 7, 2002, which is a divisional application of U.S. Ser. No. 09/309,078, filed May 10, 1999, now issued as U.S. Pat. No. 6,424,950.

TECHNICAL FIELD

The present invention relates generally to output devices and more particularly to remote feature delivery for output devices.

BACKGROUND

Customers purchase conventional digital printers with a preconfigured set of features. In this context, a "feature" is a logical grouping of software functionality, such as the ability to provide an accounting of print jobs. Features are implemented through instructions that are executed by processors on the printers.

Unfortunately, the preconfigured set of features available for a given model of digital printer may not represent the features that a customer desires. A customer may add features by calling a customer service representative and placing an order. A field service representative is then dispatched to the customer site to install the ordered feature. The field service representative installs the ordered feature. The installation may be realized in any of a number of different ways and may include the steps of placing floppy disks into a drive on the digital printer or adding hardware to the digital printer. The instructions for realizing the ordered feature are read off the floppy disk and installed on the digital printer. This approach has the drawbacks of being both time-consuming and labor-intensive. Moreover, it is difficult for a customer to install features quickly. A significant amount of time may elapse between when a customer orders the feature and when the feature is installed.

SUMMARY OF THE INVENTION

The present invention addresses the above-described limitations of conventional digital printers by providing a remote feature delivery method for output devices. In one embodiment of the present invention, when a customer seeks to add a new feature to a printer, the customer contacts a vendor. The vendor sends the customer a feature coupon that contains a feature description and a feature ID. When the customer wishes to install the feature, the customer redeems the coupon by providing the feature ID and the feature description to a redemption center. The redemption center may be, for example, a call center or a web site. The redemption center returns a feature key to the customer. The feature key may take the form of a print job which the customer prints on the printer to install the feature. Thus, there is no need for a service representative to visit the customer premises, and there is no significant time delay.

In accordance with one aspect of the present invention, a programmable feature is provided for installation on an output device, such as a printer or a reproducing apparatus. In accordance with this method, a coupon is provided for the installation of the programmable feature. The coupon contains information, including identifying information that identifies the programmable feature. At least a portion of the information contained on the coupon is received at a redemption center. In response to receiving the information, the redemption center forwards a package to a destination for installing the programmable feature on the output device. The package may be a print job containing instructions for installing the programmable feature.

In accordance with another aspect of the present invention, an output device includes an interface for receiving a feature key for installing a programmable feature on the output device. The feature key contains encrypted information. The output device also includes a storage that holds a decryption key. The output device further includes a processor for processing the feature key to install the programmable feature. The processing entails using the decryption key to decrypt the encrypted information contained in the feature key.

In accordance with a further aspect of the present invention, a method is practiced in an order fulfillment facility. According to this method, a request is received from a customer for a coupon. The coupon is redeemable to install a programmable feature on an output device. The coupon is obtained and contains encrypted data that provides a description for the programmable feature. The coupon is forwarded to the customer.

BRIEF DESCRIPTION OF THE DRAWINGS

An illustrative embodiment of the present invention will be described below relative to the following drawings.

DETAILED DESCRIPTION

Figure 1:
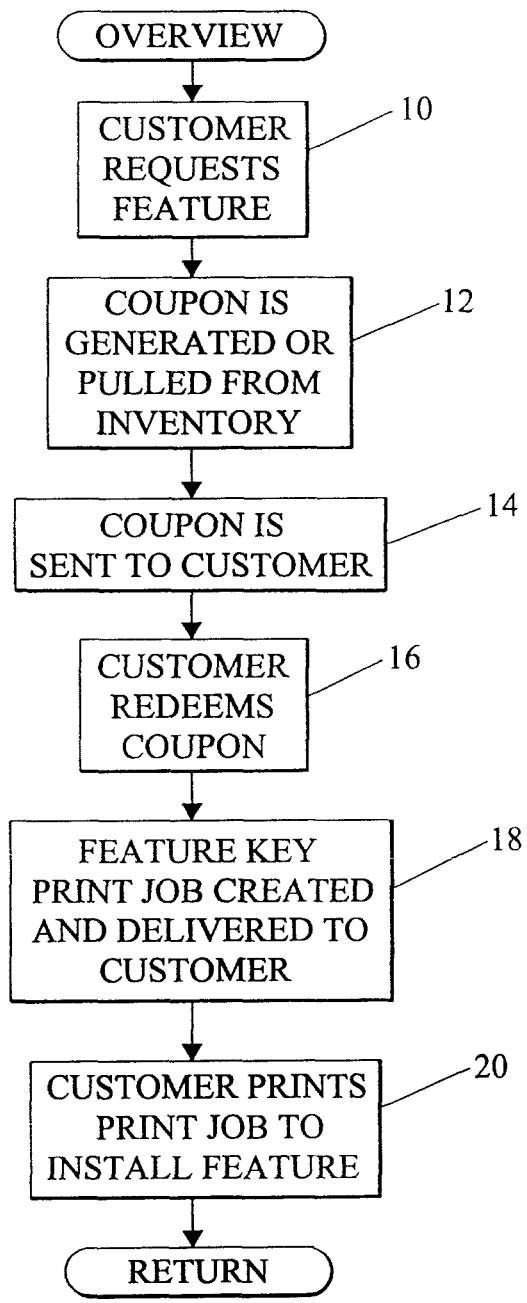
FIG. 1 is a flow chart that provides an overview of the steps that are performed to deliver a feature in the illustrative embodiment of the present invention.

The illustrative embodiment provides an approach for delivering features to an output device, such as a digital printer. This approach eliminates the need to send field service representatives to customer sites to install features. The illustrative embodiment leverages the behavior of the output device to install the feature quickly and easily. The approach incorporates security provisions to ensure that only paying customers are able to install ordered features.

In the illustrative embodiment, when a customer desires a feature, the customer orders the feature from an order fulfillment facility. The customer pays for the feature, and a kit containing a feature coupon is forwarded to the customer. The feature coupon contains an encrypted coupon ID and a textual description of the feature. The coupon ID is secure and contains a textual description of the feature embedded within it. The coupon ID serves as a proof of purchase to evidence that the customer purchased the feature. When the customer desires to install the feature, the customer contacts a redemption facility. The customer is asked to provide the coupon ID, the textual description of the feature and a hardware address for the printer. The redemption facility decrypts the coupon ID and matches the textual description of the feature contained therein with the textual description provided by the customer. If there is a match, a feature key is generated. The feature key contains an encrypted line in which the hardware address of the printer and the feature ID are embedded. The feature key may be forwarded to the customer as a print job. When the customer prints the feature key, the feature is installed on the printer. The printer contains intelligence for decrypting the encrypted line contained in the feature key and extracting the hardware address and the feature ID. If the hardware address contained in the encrypted line matches the hardware address of the printer, the printer installs the feature.

For the sake of clarity, it is helpful to define a few terms that are used in the discussion below.

A "coupon" is a unit of information that contains evidence that a customer purchased a feature. A coupon may also contain information identifying the feature. A coupon may take many forms. For example, a coupon may be a printed piece of paper that contains a coupon ID and a description of a feature. Alternatively, a coupon may be an electronic message or other type of communication. Still further, a coupon may be a record or other variety of data structure that contains information regarding a feature.

A "redemption center" is a facility at which a customer may redeem a coupon to receive materials for installing a feature. A redemption center may be a computer system, like a web server, or may alternatively be a call center or other physical facility through which customers interact with service representatives.

An "output device" is a device that generates output, such as printed material, audio output or video output. Output devices include but are not limited to printers, reproducing apparatus, copiers, and facsimile machines.

A "feature" is a logical unit of software functionality. Features are "programmable" in that features may be programmatically added or deleted from an output device.

Figure 2:
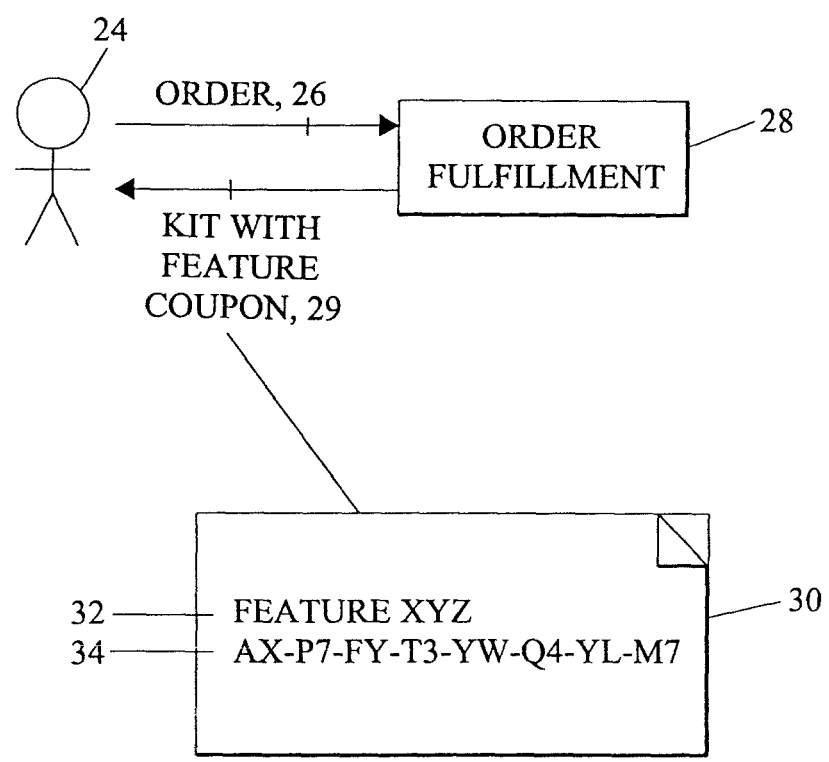
FIG. 2 illustrates the data flow between a customer and an order fulfillment facility in the illustrative embodiment.

FIG. 1 is a flow chart that provides an overview of the steps performed in the illustrative embodiment of the present invention to install a feature on a customer output device. For illustrative purposes, in the discussion below, it is presumed that the output device is a printer. Nevertheless, those skilled in the art will appreciate that the present invention may also be practiced with other varieties of output devices. Initially, the customer requests a feature from an order fulfillment facility (step 10 in FIG. 1). The customer may request the feature by calling the order fulfillment facility 28 (FIG. 2), writing to the order fulfillment facility, sending facsimile messages to the order fulfillment facility or even physically visiting the order fulfillment facility 28, depending upon the nature of the order fulfillment facility 28. The order fulfillment facility 28 may be a computer server, such as a web server, that allows the customer to interact with a vendor. Those skilled in the art will appreciate that the order fulfillment facility 28 may also take the form of an intranet or extranet server that is connected to an intranet or extranet, respectively. Thus, as shown in FIG. 2, the customer 24 places an order 26 with the order fulfillment facility 28 for a particular feature.

The order fulfillment facility 28 generates a feature coupon in response to the order 26 or pulls a coupon from inventory (step 12 in FIG. 1). An inventory of coupons may be created ahead of time for use as needed. As was mentioned above, the coupon may take many forms. FIG. 2 illustrates an example where the feature coupon 30 contains a textual description 32 that identifies the feature (e.g. "Feature XYZ") and a coupon ID 34. The coupon ID is an encrypted line of text in the illustrative embodiment. In the example shown in FIG. 2, the coupon ID 34 contains eight pairs of characters separated by dashes. This coupon ID 34 contains the textual description of the feature 32 embedded within it. The coupon ID 34 acts as a proof of purchase in that a valid coupon ID evidences that the customer has to a high probability tendered payment for the feature. Synthesis of a valid coupon ID by a party that has not paid for a feature is possible but highly unlikely (i.e. there is a low probability of synthesizing a valid coupon ID).

The customer 24 must pay for the feature prior to receiving the feature coupon 30. A number of different forms of payment may be used. The customer 24 may have an existing account with the vendor. Alternatively, the customer may provide electronic forms of payment, such as credit card payment, electronic fund transfer or digital cash payment. In another alternative, the customer 24 may be billed (i.e. sent a bill) for the new feature with payment due at the time of receipt of the bill.

Figure 3:
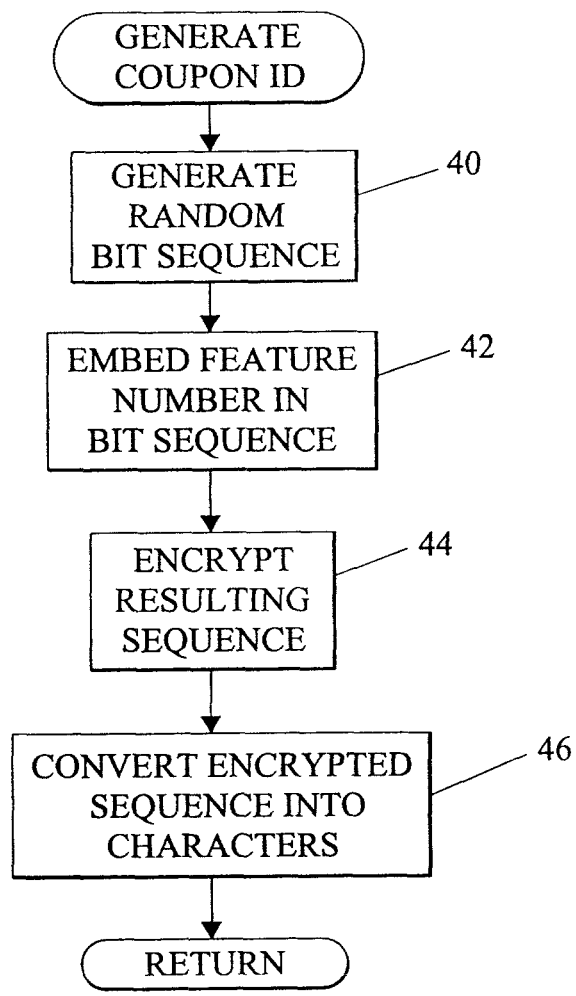
FIG. 3 is a flow chart illustrating the steps that are performed to generate a coupon ID.

FIG. 3 is a flow chart illustrating the steps that are performed to generate the coupon ID 34. Initially, a random bit sequence is generated (step 40 in FIG. 3). This bit sequence may be generated using a pseudo-random number generator. Those skilled in the art will appreciate that any of a number of different well-known techniques for generating random bit sequences may be used. In the illustrative embodiment, the random bit sequence is 64 bits long. Those skilled in the art will appreciate that the number of bits in the random bit sequence may vary. Moreover, the random bit sequence may contain more bits than are required to generate the coupon ID.

Each feature has an associated feature number. In the illustrative embodiment, the feature numbers are in the range of 0 to 255 such that the feature numbers may be each represented as an eight-bit number. For example, a feature for providing job accounting may have feature number 42 while a feature for scanning documents to a network may have feature number 163. Those skilled in the art will appreciate that the feature numbers need not be represented by numerical values but may be represented instead by character values or alphanumeric values. Moreover, the feature numbers may be specified by a different number of bits (i.e. not eight bits). The feature number for the feature ordered by the customer is embedded in the 64-bit block of random bits at an agreed upon location or at a determinable location (i.e. discernable to both the encoder and the decoder) (step 42 in FIG. 3). The resulting sequence of bits is encrypted (step 44 in FIG. 3). Those skilled in the art will appreciate that a number of different encryption algorithms may be employed to encrypt the block of random bits in which the feature number is embedded. One suitable encryption algorithm is the Blowfish algorithm developed by Bruce Schneider. More generally, any of a number of block cipher algorithms may be employed.

The encryption produces a binary sequence of bits. In order to make this sequence of bits more human readable, the encrypted sequence is converted into characters (step 46 in FIG. 3). This conversion is performed to make it easier for the customer to provide the coupon ID 34 when requested during redemption (discussed below). The conversion of the encrypted sequence into characters may be performed using a Base 18 encoding scheme. Each eight-bit block of data is converted into two characters. Thus, eight two-character pairs are produced by applying this encoding to the 64 bit encrypted data block.

Those skilled in the art will appreciate that different encoding schemes may be used to generate characters from the encrypted sequence of data. Furthermore, those skilled in the art will appreciate that the conversion of the encrypted data into characters is not a required step for practicing the present invention.

After the feature coupon has been generated (step 12 in FIG. 1), the feature coupon is sent to the customer as part of a kit 29 (step 14 in FIG. 1). The kit 29 may contain only the feature coupon but may also contain other information, such as documents, floppy disks and the like. The kit 29 may be transmitted electronically to the customer 24 over computer connections or modem connections. Alternatively, the kit 29 may be sent to the customer via mail service, courier service or other delivery service.

Once the customer 24 has received the feature coupon 30, the customer may redeem the coupon. The feature coupon 30, however, has no stated shelf life and may be redeemed whenever the customer desires to redeem it. The feature coupon 30 is self-validating so there is no need for the vendor to maintain customer information regarding which customer received the coupon and when the coupon was issued. The vendor may, however, wish to maintain such records, in some instances.

Figure 4:
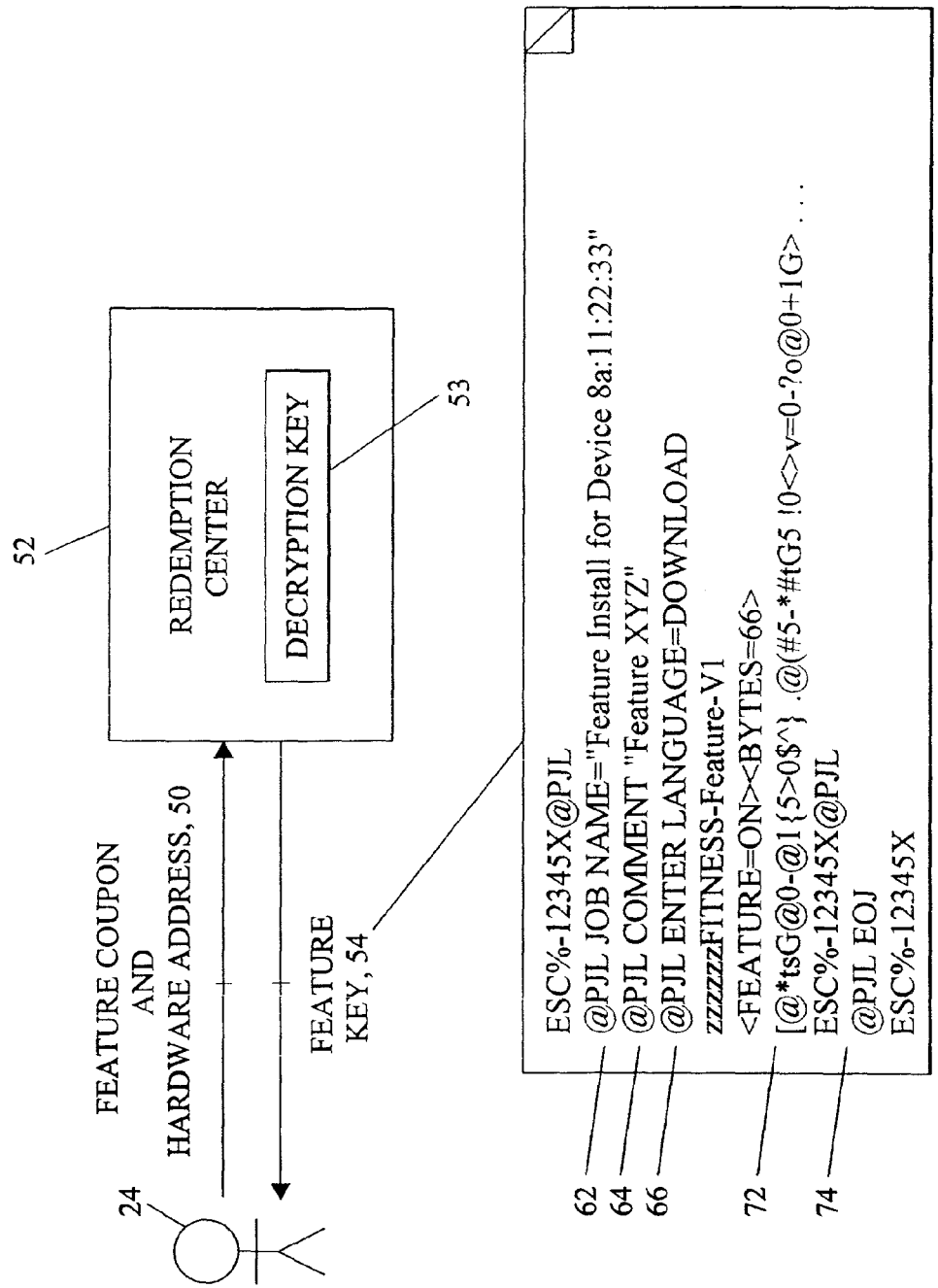
FIG. 4 is a diagram that illustrates the data flow between a customer and a redemption center to obtain a feature key.

When the customer desires to install the feature, the customer redeems the feature coupon 30 (step 16 in FIG. 1). As shown in FIG. 4, the customer 24 redeems the feature coupon 30 by contacting a redemption center 52. The redemption center 52 may be, for instance, a call center, which the customer calls via telephone. The redemption center 52 may be instead a computer server, such as a web server, which the customer contacts via computer connection. When the customer 24 contacts the redemption center 52, the customer is prompted to provide information from the feature coupon and a hardware address 50 for the printer on which the customer wishes to install the feature.

The hardware address may be any of a number of different values. In the illustrative embodiment, the hardware address refers to a globally unique 12-character string that is derived from Ethernet circuitry (see 107 in FIG. 6) on the printer 100. Those skilled in the art will appreciate that other hardware address values may be utilized. In the illustrative embodiment, the customer 24 is prompted to provide the textual description of the feature 32 and the feature ID 34.

The redemption center 52 decodes the coupon ID 34 to generate the encrypted block of data. The redemption center 52 possesses the decryption key 53 for decrypting the coupon ID 34. The redemption center 52 uses the decryption key 53 to decrypt the decoded block of data. The redemption center 52 may then extract the feature number embedded within the data. This feature number is associated with a textual description of the feature. The associated textual description of the feature is compared with the textual description of the feature 32 provided by the customer 24 to determine if there is a match. If there is a match, it is presumed that the feature coupon 30 is valid for the designated feature. The redemption center 52 then takes steps to generate a feature key 54.

In the illustrative embodiment, the feature key is a print job constructed using PJL (Printer Job Language). PJL gives job-level printer control to application programs. FIG. 4 shows an example of a feature key 54 written in PJL that contains a number of PJL commands. For example, line 62 contains a PJL command that identifies the name of the print job. Line 64 contains a comment that identifies the feature description. Line 66 contains an enter command, and line 74 contains an end of job (EOJ) command. The feature key 54 also contains an encrypted line of text 72. The encrypted line of text 72 contains a hardware address for the printer and a feature ID for the ordered feature. This encrypted line of text is decrypted by the destination printer and the hardware address and feature ID are extracted (as discussed below). The hardware address is compared with the hardware address of the printer to determine whether the feature key is valid or not.

Figure 5:
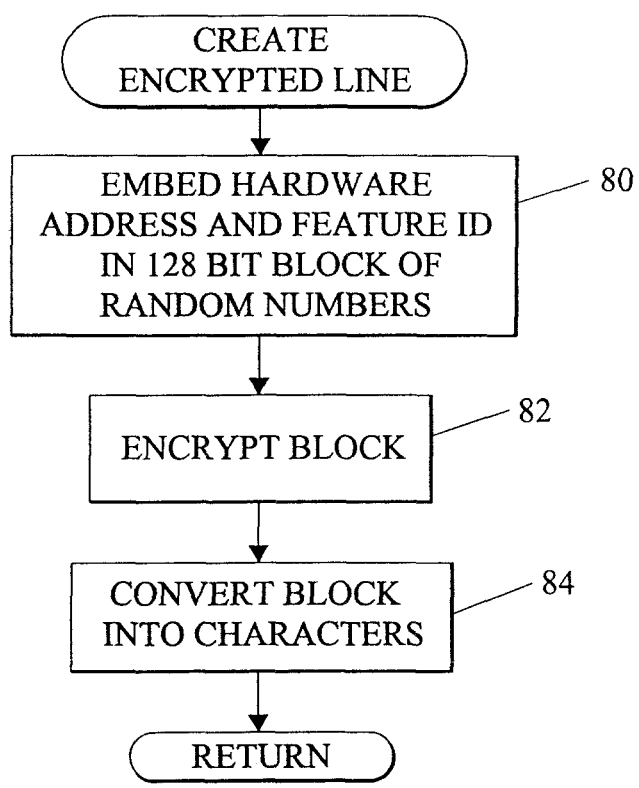
FIG. 5 is a flow chart illustrating the steps that are performed to create an encrypted line of text in the feature key.

FIG. 5 is a flow chart illustrating the steps that are performed to create the encrypted line 70. A 128-bit block of random numbers is generated and the hardware address is embedded within this 128-bit block of random numbers at an agreed upon location or at a discernable location (step 80 in FIG. 5). The block is then encrypted using an encryption algorithm, such as the Blowfish algorithm (step 82 in FIG. 5). A different encryption key is used for encrypting the feature key than is used in encrypting the coupon ID 34. The block is then converted into characters using Base 19 coding (step 84 in FIG. 5). Those skilled in the art will appreciate that different encryption algorithms may be utilized. Moreover, a different encoding algorithm may be employed. Those skilled in the art will appreciate that there may be no need to convert the encrypted block of bits into characters. Furthermore, the number of bits used in the block may vary (i.e. 128 bits need not be used to practice the present invention).

Figure 6:
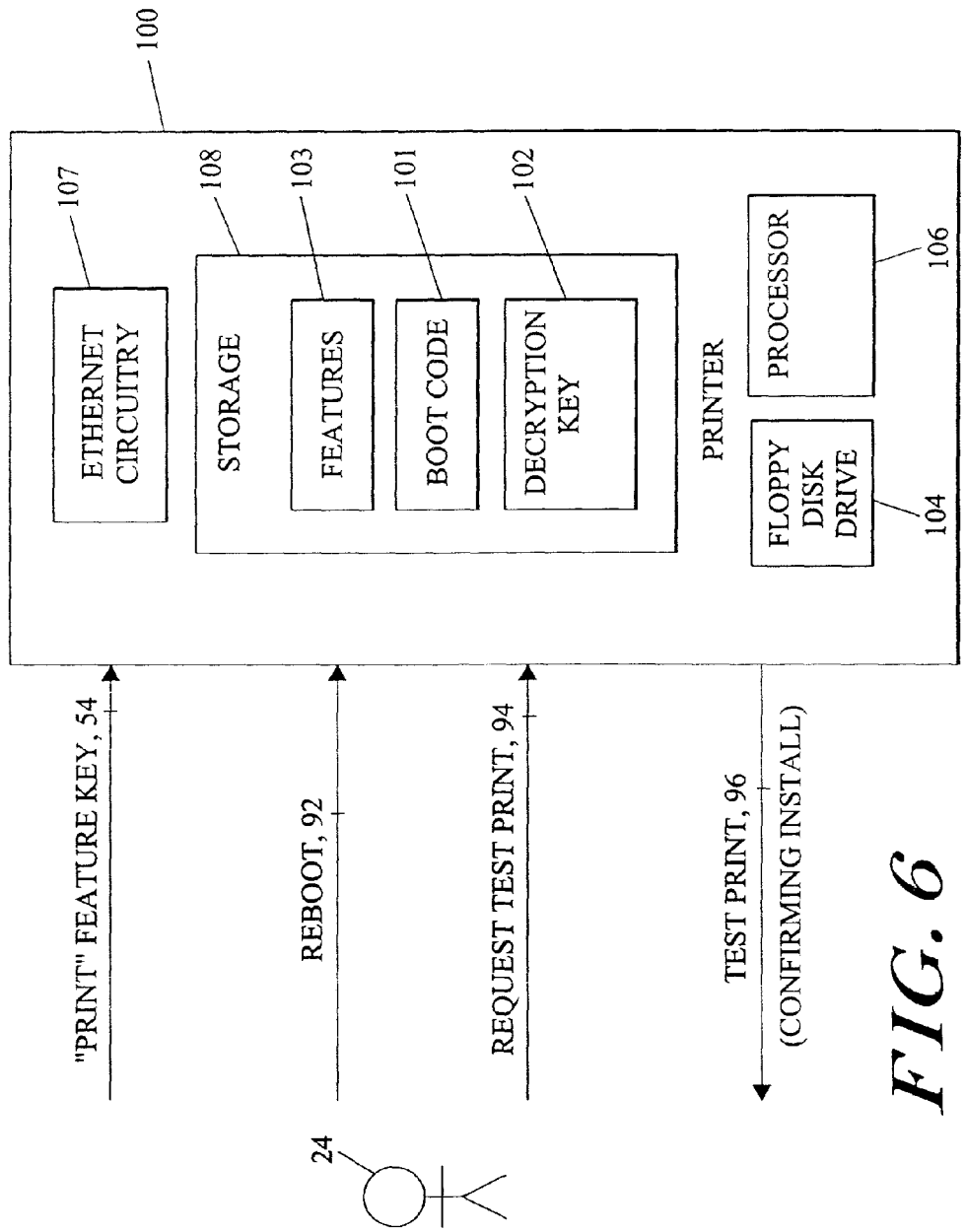
FIG. 6 illustrates the data flow between a customer and a printer.

In this fashion, the feature key print job is created and sent to the customer 24 (step 18 in FIG. 4). The customer then prints the print job to install the feature (step 20 in FIG. 1). Specifically, as shown in FIG. 6, the customer 24 receives the print job and prints the print feature key 54 on the printer 100. The printer 100 includes a processor 106 for executing PJL instructions. The printer 100 also contains a floppy disk drive 104 or other secondary storage device, and includes a storage 108. The storage 108 holds boot code 101 that is executed when the printer 100 is booted. In the illustrative embodiment, the storage 108 also includes instructions for each of the features 103 that may be installed. The instructions are not received as part of the print feature key 54; rather, the print feature key enables a switch that is maintained for the desired feature to be switched on so that the instructions are active and executed. The features that have not been installed have switches that are "off." Features that are "off" are not active and are not executed. The storage 108 additionally holds the decryption key 102 for decrypting the encrypted line 70 contained in the print feature key 54. The printer includes Ethernet circuitry 107 that is used to derive the unique 12-character hardware address.

Those skilled in the art will appreciate that in alternative embodiments, the instructions for realizing a feature may be sent as part of the print feature key. There is no need for the instructions to be already resident on the printer.

Figure 7:
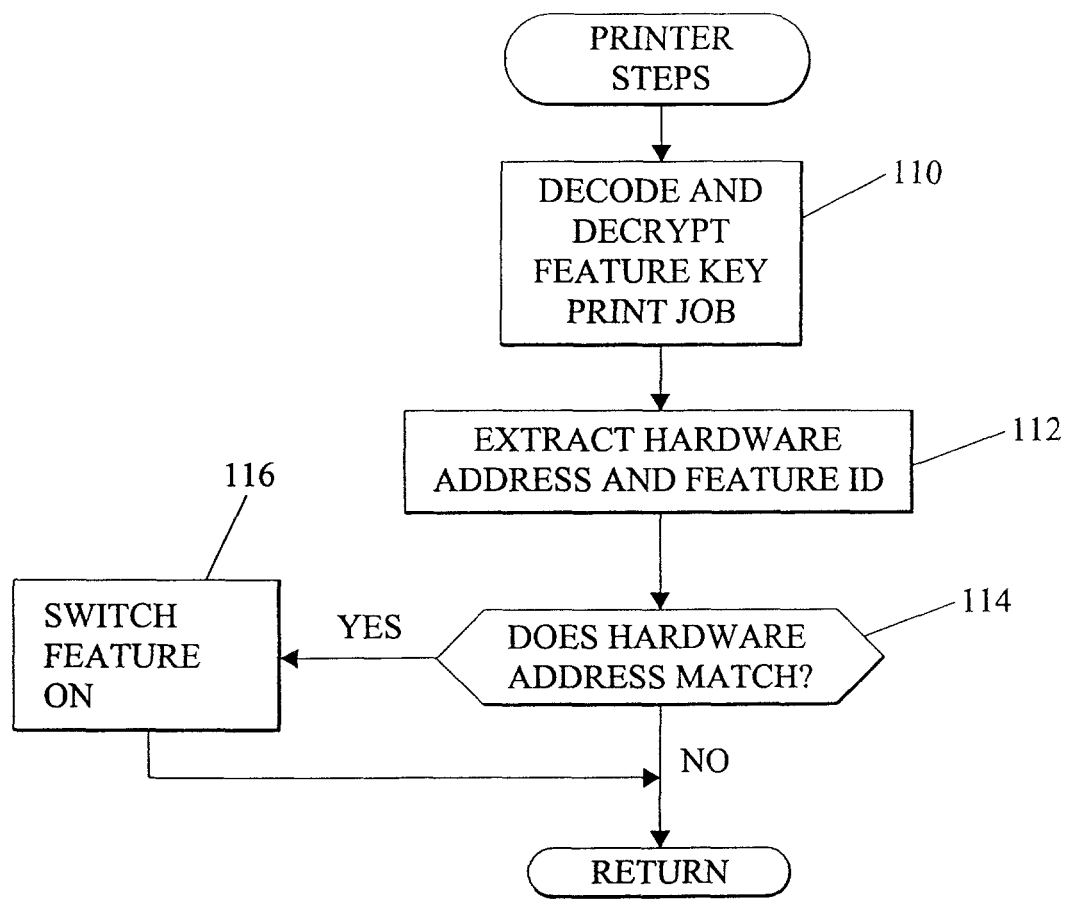
FIG. 7 is a flow chart illustrating the steps that are performed by a printer to install a feature.

FIG. 7 is a flow chart depicting the steps that are performed when the printer 100 receives the feature key 54. The printer 100 extracts the encrypted line 70 in feature key 54, decodes the line and decrypts the decoded line using the decryption key 102. The hardware address that has been embedded in the random bit lock is extracted along with the feature ID (step 112 in FIG. 7). A determination is then made whether the hardware address that has been extracted matches the hardware address of the printer 100 (step 114 in FIG. 7). If there is a match, it is indication that the feature key is valid and the switch for the associated feature is switched "on" (step 116 in FIG. 7). If there is not a match, it is an indication that the feature key is not valid and the feature switch remains "off" for the desired feature. The encrypted line 70 is configured so that it may not be easily reproduced or decrypted. One must possess the decryption key 102 in order to decrypt this line. Thus, the feature key is relatively secure and may not be readily copied. The bit sequence may vary from job to job. Moreover, the feature key is only valid for a particular hardware address, and, hence, can not be readily pirated for installation on other output devices.

Once the printer has received the feature key and performed processing to switch "on" the desired feature, the printer 100 must take additional steps to complete installation. Specifically, the printer 100 must reboot 92 using the boot code 101. This allows appropriate configuration to take place to install the feature. A test print 96 may then be requested 94 to insure that printing is working properly.

While the present invention has been described with reference to an illustrative embodiment thereof, those skilled in the art will appreciate that various changes in form and detail may be made without departing from the intended scope of the present invention as defined in the appended claims.

The invention claimed is:

1. A system, comprising:
an order fulfillment facility, comprising at least one processor, for receiving over a communication network an order from a requester for a purchase of one or more output-device programmable features; the order fulfillment facility configured to (i) effect the purchase of the one or more output-device programmable features with payment information, (ii) produce a coupon that contains an encrypted coupon identifier having a textual description of the one or more output-device programmable features; and (iii) respond to the order by transmitting the coupon to the requester after the purchase of the one or more programmable features; and
a redemption center, comprising at least one processor, configured to (i) receive over a request from the requester to redeem the coupon, including the encrypted coupon identifier and the textual description, (ii) decrypt the coupon identifier and extract the textual description of the one or more output-device programmable features from the coupon identifier, (iii) compare a textual description of a potential programmable feature to the textual description that was extracted from the coupon identifier, (iv) generate a feature key when a match exists between the compared textual descriptions, (v) produce, and forward over the communication network to a destination, a package that includes the feature key for installing the one or more output-device programmable features in response to receiving the request to redeem the coupon.

2. The system of claim 1, wherein the order fulfillment facility comprises a computer server.

3. The system of claim 1, further comprising an output device for receiving the package forwarded by the redemption center over the communication network to the destination; wherein receipt of the package by the output device permits installation of the one or more output-device programmable features on the output device.

4. The system of claim 3, wherein the output device is adapted to generate audio output.

5. The system of claim 3, wherein the output device is adapted to generate video output.

6. The system of claim 3, wherein the output device is adapted to generate audio and video output.

7. The system of claim 1, wherein the redemption center comprises a computer server.

8. The system of claim 1, wherein the redemption center uses information from the coupon to validate that payment has been tendered for the programmable feature.

9. The system of claim 3, wherein the output device includes a processor for processing the feature key and a storage element that holds a decryption key; the processor in processing the feature key using the decryption key for determining whether to install the output-device programmable feature thereon.

10. The system of claim 1, wherein the communication network comprises one or more of an intranet, an extranet, and a telephone network.

* * * * *